(12) United States Patent
d'Abreu et al.

(10) Patent No.: US 11,288,017 B2
(45) Date of Patent: Mar. 29, 2022

(54) DEVICES, SYSTEMS, AND METHODS FOR STORING DATA USING DISTRIBUTED CONTROL

(71) Applicant: Smart IOPS, Inc., Milpitas, CA (US)

(72) Inventors: Manuel Antonio d'Abreu, El Dorado Hills, CA (US); Ashutosh Kumar Das, Cupertino, CA (US)

(73) Assignee: SMART IOPS, INC., Milpitas, CA (US)

( * ) Notice: Subject to any disclaimer, the term of this patent is extended or adjusted under 35 U.S.C. 154(b) by 0 days.

(21) Appl. No.: 15/904,080

(22) Filed: Feb. 23, 2018

(65) Prior Publication Data
US 2018/0239537 A1    Aug. 23, 2018

Related U.S. Application Data

(60) Provisional application No. 62/462,492, filed on Feb. 23, 2017.

(51) Int. Cl.
*G06F 3/06* (2006.01)

(52) U.S. Cl.
CPC .............. *G06F 3/067* (2013.01); *G06F 3/061* (2013.01); *G06F 3/0604* (2013.01); *G06F 3/068* (2013.01);
(Continued)

(58) Field of Classification Search
CPC ...... G06F 3/067; G06F 3/0644; G06F 3/0604; G06F 3/068; G06F 3/061; G06F 2212/7202; G06F 2212/7208
See application file for complete search history.

(56) References Cited

U.S. PATENT DOCUMENTS 5,539,895 A    7/1996  Bishop et al.
9,244,831 B2   1/2016  Maghraoui et al.
(Continued)

OTHER PUBLICATIONS

Exploiting Sequential and Temporal Localities to Improve Performance of NAND Flash-Based SSDs; Lee et al.; ACM Transactions on Storage, vol. 12, iss. 3, Article No. 15; Jun. 2016 (Year: 2016).
(Continued)

*Primary Examiner* — Kalpit Parikh
(74) *Attorney, Agent, or Firm* — Willink & Hunt LLP; Marcus T. Hunt

(57) ABSTRACT

In certain aspects, a data storage device is provided including a distributed controller configured to communicate with a main controller; and first and second memory devices of respective first and second non-volatile memory technologies. The first and second memory devices are coupled to the distributed controller configured to control access to the first and second memory devices. In certain aspects, a system is provided including a main controller; first and second distributed controllers coupled to the main controller; at least one first memory device coupled to the first distributed controller; and at least one second memory device coupled to the second distributed controller. The main controller is configured to control access to the first and second distributed controllers. The first and second distributed controllers are configured to control access to the respective at least one first and second memory devices that include at least two non-volatile memory technologies.

26 Claims, 6 Drawing Sheets

(52) U.S. Cl.
CPC .... *G06F 3/0644* (2013.01); *G06F 2212/7202* (2013.01); *G06F 2212/7208* (2013.01)

(56) References Cited

U.S. PATENT DOCUMENTS

| | | | |
|---|---|---|---|
| 9,507,664 | B2 | 11/2016 | Ogihara |
| 9,530,491 | B1* | 12/2016 | Uttarwar ............. G06F 12/0246 |
| 10,372,349 | B2 | 8/2019 | Xu et al. |
| 10,552,085 | B1 | 2/2020 | Chen et al. |
| 2006/0004957 | A1* | 1/2006 | Hand, III ............ G06F 12/0866 |
| | | | 711/113 |
| 2008/0109592 | A1 | 5/2008 | Karamcheti et al. |
| 2008/0147962 | A1 | 6/2008 | Diggs et al. |
| 2008/0215952 | A1* | 9/2008 | Bae ........................ G11C 16/22 |
| | | | 714/756 |
| 2008/0288716 | A1* | 11/2008 | Arakawa ............. G06F 12/0246 |
| | | | 711/103 |
| 2009/0006760 | A1* | 1/2009 | Bartley ............... G06F 12/0844 |
| | | | 711/131 |
| 2009/0168525 | A1* | 7/2009 | Olbrich ................ G11C 7/1063 |
| | | | 365/185.11 |
| 2009/0172333 | A1* | 7/2009 | Marcu ................... G06F 3/0611 |
| | | | 711/165 |
| 2010/0174847 | A1 | 7/2010 | Paley et al. |
| 2011/0060927 | A1* | 3/2011 | Fillingim ............ G06F 11/1441 |
| | | | 713/320 |
| 2011/0077749 | A1 | 3/2011 | Shang et al. |
| 2012/0246391 | A1 | 9/2012 | Meir et al. |
| 2014/0143481 | A1* | 5/2014 | Asnaashari ............. G06F 13/00 |
| | | | 711/103 |
| 2014/0337665 | A1 | 11/2014 | Ogihara |
| 2015/0347302 | A1 | 12/2015 | Hagersten et al. |
| 2016/0062696 | A1 | 3/2016 | Cerrelli et al. |
| 2016/0118132 | A1* | 4/2016 | Prins .................. G11C 16/3431 |
| | | | 714/704 |
| 2016/0179371 | A1* | 6/2016 | Sinclair .................. G06F 3/064 |
| | | | 711/103 |
| 2016/0179386 | A1 | 6/2016 | Zhang |

OTHER PUBLICATIONS

A Distributed Reconfigurable Active SSD Platform for Data Intensive Applications; Abbani et al.; IEEE International Conference on High Performance Computing and Communications; Sep. 2-4, 2011 (year: 2011).

* cited by examiner

DEVICES, SYSTEMS, AND METHODS FOR STORING DATA USING DISTRIBUTED CONTROL

CROSS-REFERENCE TO RELATED APPLICATIONS

This application claims benefit under 35 U.S.C. § 119(e) of U.S. Provisional Application No. 62/462,492, filed Feb. 23, 2017, the entirety of which is incorporated herein by reference.

FIELD OF THE DISCLOSURE

The present disclosure relates generally to the field of data storage, and in particular to use of distributed control in memory management.

BACKGROUND

With advances in non-volatile memory (NVM) technologies, device types, and packaging schemes; diverse NVM devices and technologies are becoming available, each having its own set of management and control requirements. Solid-state storage devices (SSDs) traditionally implement a centralized control architecture include a centralized controller that manages a large array of memories of a single memory technology, such as a planar NAND flash, a 3D NAND, a ReRAM or MRAM device technology for example. Each of these technologies has its respective strengths and weaknesses. Usage models for an SSD might have performance needs that cannot be met by just one type of technology. Furthermore, various technologies may have different raw bit error rates, thus requiring different error correction approaches tailored to each specific device type, as well as the technology specific memory management schemes. Storage systems having a centralized architecture based solely on a centralized controller may be able to sufficiently meet the requirements when a single memory technology is implemented; however, such systems are unable to sufficiently meet the varied requirements of a hybrid system that incorporates a mix of more than one memory technology.

SUMMARY

In certain aspects of the present disclosure, a data storage device is provided that includes a distributed controller configured to communicate with a main controller; a first memory device of a first non-volatile memory technology; and a second memory device of a second non-volatile memory technology that is different than the first non-volatile memory technology. The first and second memory devices are coupled to the distributed controller. The distributed controller is configured to control access to the first and second memory devices.

In certain aspects of the present disclosure, a system is provided that includes a main controller; a first distributed controller coupled to the main controller; at least one first memory device coupled to the first distributed controller; a second distributed controller coupled to the main controller; and at least one second memory device coupled to the second distributed controller. The main controller is configured to control access to the first distributed controller and to the second distributed controller. The first distributed controller is configured to control access to the at least one first memory device. The second distributed controller is configured to control access to the at least one second memory device. The at least one first and second memory devices include at least two non-volatile memory technologies.

BRIEF DESCRIPTION OF THE DRAWINGS

For a better understanding of at least an embodiment, reference will be made to the following Detailed Description, which is to be read in conjunction with the accompanying drawings, wherein.

DETAILED DESCRIPTION

Figure 1:
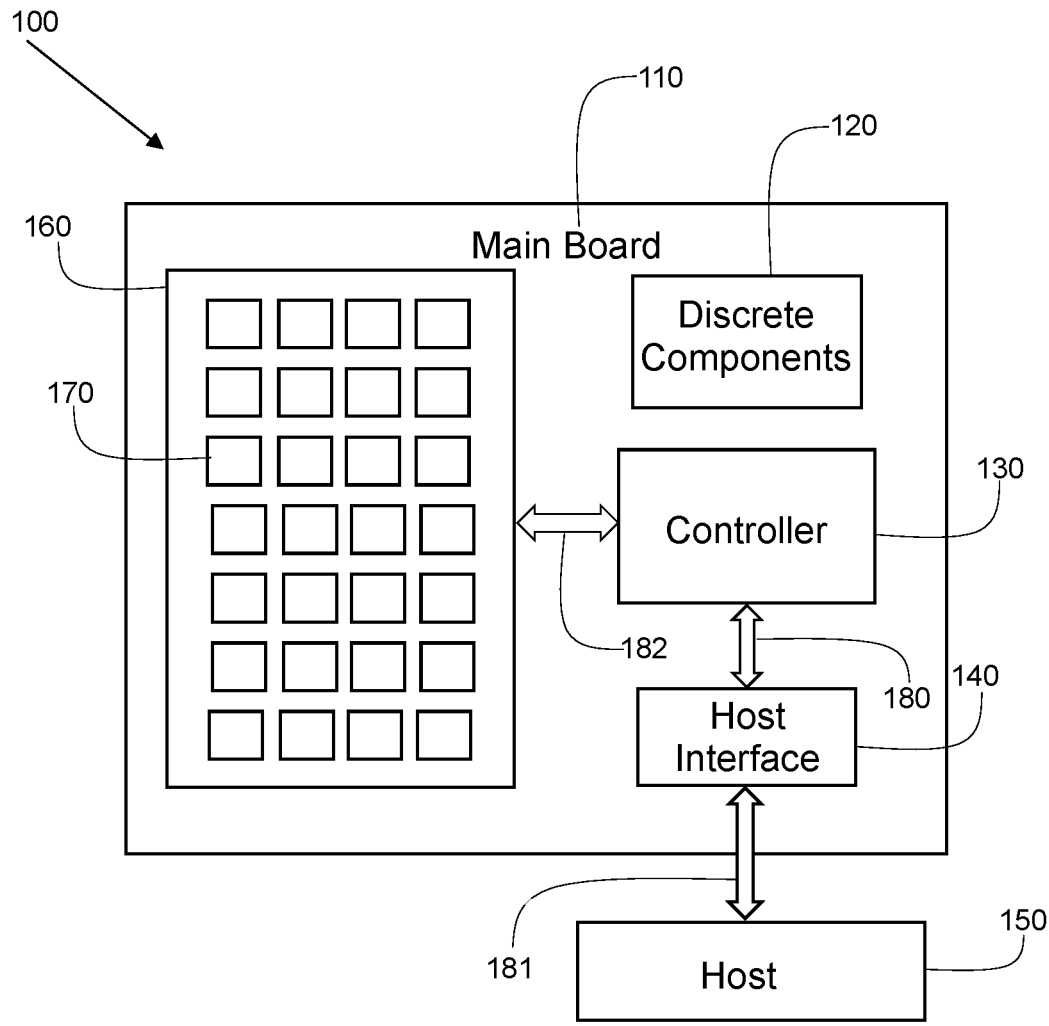
FIG. 1 illustrates a block diagram for an exemplary system configured to program non-volatile memory according to a programming scheme using a centralized control architecture, according to an embodiment.

Before aspects of the present disclosure are described below with reference to the drawings. In the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

In certain aspects, the present disclosure provides devices, systems, and methods for storing data using a distributed control architecture (or scheme) that can utilize diverse non-volatile memory (NVM) technologies, device types, and packaging schemes (referred to generally and collectively herein as "non-volatile memory technologies" or "memory technologies"). Furthermore, in certain aspects, the devices, systems, and methods implement different types of error correction that may be required or preferred for the various non-volatile memory technologies. The distributed control architecture provides storage devices and systems with the flexibility to be optimized for use with multiple memory technologies. Furthermore, the distributed control architecture enables memory devices to be configured in groupings that are more manageable than in the centralized control architecture, making error correction more manageable and reducing software and control issues and complexity. Customization may also be easily implemented. For example, storage systems may be customized by including memory modules (e.g., memory cards) having one or more memory technologies as desired. In certain embodiments, these memory modules are removable and can be replaced with other memory modules having different memory technologies and types of error correction as needed or desired. For example, in one illustrative embodiment, memory technologies such as SLC and MLC flash or ReRAM may be implemented for "hot" data that is accessed frequently, while TLC or QLC may be implemented for "cold" data that is not accessed frequently. Furthermore, different types of error correction may be implemented, such as Reed-Solomon encoding for one memory technology and LDPC for another memory technology, for example. It should be appreciated that these are illustrative examples and not intended to be limiting. Other variations of memory technologies and error corrections may be implemented in other embodiments.

In certain aspects, the present disclosure describes devices, systems, and methods of programming data to, or reading data from, a memory card (or memory card module), a storage system, or a set of memory cards, according to the use of an architecture using a distributed controller scheme for the memory cards or storage system. For example, a controller (or memory controller) of a data storage device may receive a data packet to be stored in a number of memory devices. The controller may partition the data word into multiple portions and the multiple portions may be interleaved across multiple memory devices. Also, the controller may simultaneously start parallel reads from several memory devices. Additionally, prior to the multiple data packets being stored into, or read from, the memory card or storage system, a logical address corresponding to the data packets may be mapped to multiple physical addresses that indicates where each of the multiple data packets is to be stored in, or read from, the memory card or storage system. The writing of data and reading of data can be performed simultaneously across several memory cards in the storage system using a distributed control architecture.

Due to temperature, time, program cycling of the memory device, incomplete erasure of the memory, programming errors, or other conditions, errors can occur in stored data. The number of errors in a specific wordline, blocks of wordlines, or combination thereof can increase. The error profile is very specific to the memory technology. One aspect of this disclosure is the use of technology specific error correction and memory management schemes optimized to the memory technologies being used in a storage system. The storage system may, for example, use storage cards composed of memory devices from different memory technologies. Thus, the integrity of the data remains uncompromised and also the endurance of the system and capability to store data for an extended time (or data retention) can be adapted to the specific usage profile for the storage system and memory technologies. The subject matter of the present disclosure may be applicable to a wide range of areas, including, but not limited to, storage, networking, communication and computing systems, appliances on the Internet, remotely controlled appliances, design of reliable systems, artificial intelligence (AI) and machine learning, etc.

Centralized Control Architecture

FIG. 1 illustrates a block diagram for an exemplary storage system 100 (e.g., solid-state drive), which is based on a centralized control architecture having a centralized controller, according to an embodiment. In FIG. 1, a storage system 100 is shown including discrete components 120, a centralized controller 130, a host interface 140, and a memory card 160 coupled to a main board 110. The memory card 160 includes an array of memory devices, of which a memory device 170 is a representative device. The memory card 160 is not limited to any particular number of memory devices and can include a large number of memory devices. The memory devices (e.g., the memory device 160) can be based on one memory technology, such as flash, ReRAM, or other NVM technology. The main board 110 includes a bus 180 that connects the controller 130 to the host interface 140, and a bus 182 which the centralized controller 130 uses to manage the memory devices in the memory card 160. The storage system 100 of FIG. 1 communicates with a host (or host device or system) 150 through the interface 181. The interface 181 may be a PCIe, SATA, USA, or any other standard or proprietary interface. The centralized controller 130 manages the communication to the host 150, the access to the NVM, and the memory management software. The discrete components module 120 can consist of passive components such as capacitors, resistors, inductors, as well as active components such as diodes, transistors, etc.

Distributed Control Architecture

In certain aspects, storage systems may operate in data centers where usage encompasses several scenarios. Some of the data may be accessed frequently and is "hot", while other data may be accessed infrequently and is practically "cold". Therefore, "hybrid" requirements may be present for the storage systems to accommodate (or account for). To accommodate the hybrid requirements, the storage systems can be configured with distributed data control to support various non-volatile memory technologies that can be tailored to different usage scenarios. For example, memory technologies with high endurances may utilized for "hot" data that is accessed frequently, while memory technologies with low endurances may be utilized for "cold' data. Instead of having a centralized control strategy, which would not adequately accommodate the hybrid requirements, data storage devices and storage systems can be configured to include a distributed control architecture that provides distributed data control via one or more distributed controllers (or distributed memory controllers) to memory devices of one or more memory technologies. The distributed controllers can operate in conjunction with a main controller (or main memory controller) that manages host accesses, memory management, and other background tasks. The main controller can control access to the distributed controllers, such as access for read and write operations to one or more memory devices controlled by the distributed controllers The distributed controller can be configured to control access to the various memory technologies, such as access for performing read and write operations on the various memory technologies. The distributed controller can be configured to communicate with the main controller to send data to the main controller or to receive data and commands from the main controller.

Figure 2:
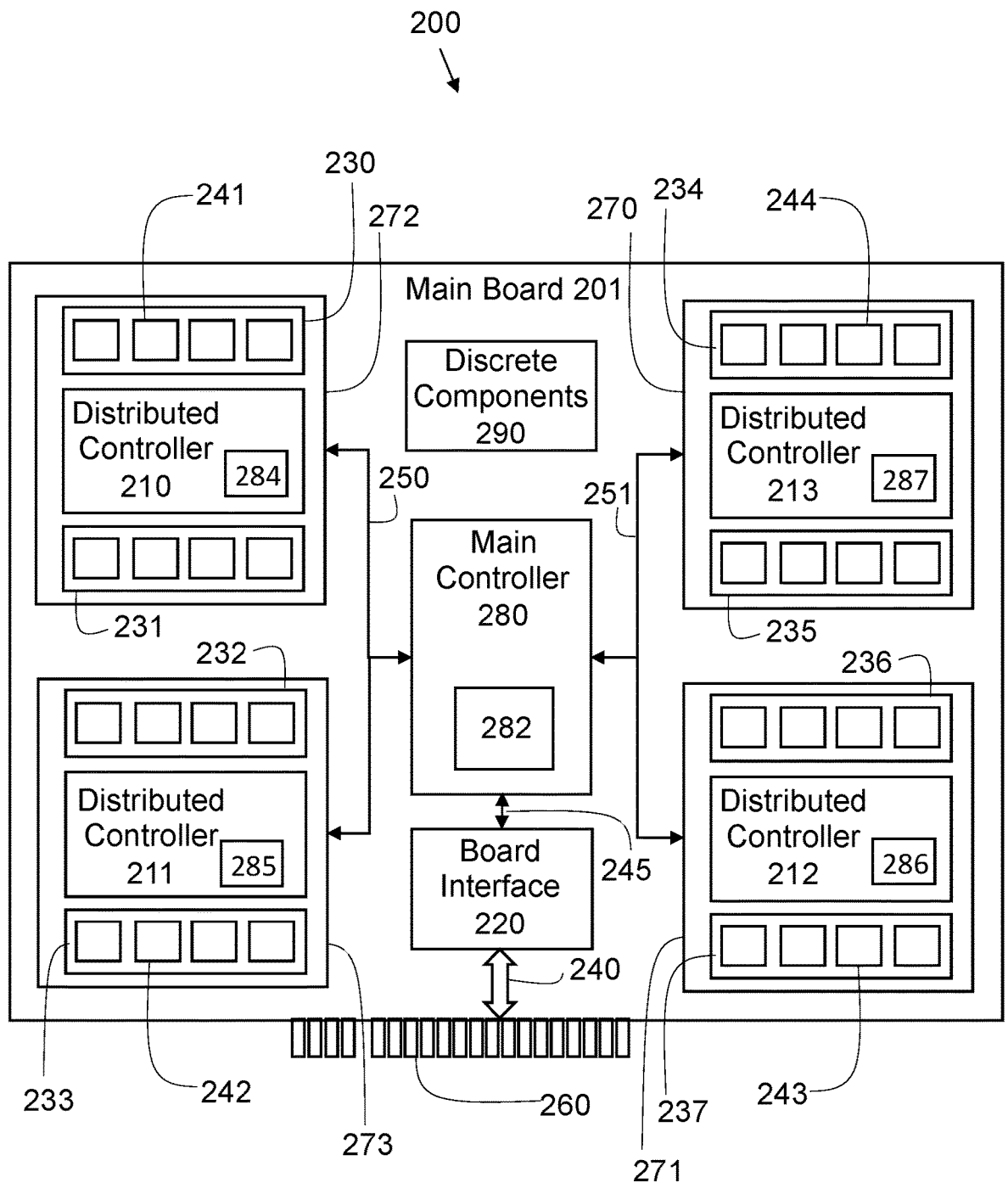
FIG. 2 illustrates a block diagram of an exemplary storage system configured to program memory according to a programming scheme using a distributed control architecture, according to an embodiment.

FIG. 2 illustrates a block diagram of an example storage system (or storage device) having a distributed control architecture, according to an embodiment. In FIG. 2, a storage system 200 is shown including a main controller 280 and memory modules 270, 271, 272, and 273. A different number of memory modules than four may be implemented in other embodiments. Each of the memory modules 270, 271, 272 and 273 is managed by distributed controllers 213, 212, 210, and 211, respectively. Each of the distributed controllers 210, 211, 212, and 213 manages respective memory banks in its domain. In the example embodiment shown in FIG. 2, the distributed controller 213 manages memory banks 234 and 235; the distributed controller 212 manages memory banks 236 and 237; the distributed controller 210 manages memory banks 230 and 231; and the distributed controller 211 manages memory banks 232 and 233. A different number of memory banks may be managed by any distributed controller in other embodiments.

Each memory bank 231, 232, 233, 234, 235, 236, and 237 can have one or more memory devices. The memory banks 230 and 231 are shown having memory devices 241; the memory banks 232 and 233 are shown having memory devices 242; the memory banks 234 and 235 are shown having memory devices 244; and the memory banks 236 and 237 are shown having memory devices 243. The memory devices 241, 242, 243, and 244 shown are exemplary and are not an exhaustive list. Each memory bank, such as memory bank 230, can have one or more memory devices, and can have a different number of memory devices than shown in the example embodiment of FIG. 2. The memory 231, 232, 233, 234, 235, 236, and 237 can have varying number of memory devices from memory bank to memory bank. One feature of the storage system 200 is that each of the memory banks 230, 231, 232, 233, 234, 235, 236, and 237 can be of a different technology. The memory devices 231, 232, 233, 234, 235, 236, and 237 can also include one or more memory dies (e.g., one memory die, two memory dies, eight memory dies, or another number of memory dies) in different embodiments. It should be appreciated that the memory devices are not limited to silicon based memory dies and other technologies, such as carbon nanotubes, sapphire or other non-silicon materials, can be implemented in other embodiments without compromising the underlying principles of the present disclosure.

In the embodiment shown in FIG. 2, the storage system 200 is shown including a main board 201, to which the main controller 280 and the memory modules 270, 271, 272 and 273 are coupled. The storage system 200 shown in FIG. 2 also includes discrete components 290, a board interface 220, a host interface 260, and connections (e.g., busses) 240, 245, 250, and 251 coupled to the main board 201. The main controller 280 communicates with the memory banks 230 and 231 of the memory module 272 via the bus 250 and the corresponding distributed controller 210; with the memory banks 232 and 233 of the memory module 273 via the bus 250 and the corresponding distributed controller 211; with the memory banks 234 and 235 of the memory module 270 via the bus 251 and the corresponding distributed controller 213; and with the memory banks 236 and 237 of the memory module 271 via the bus 251 and the corresponding distributed controller 212. The main controller 280 communicates with the board interface 220 of FIG. 2 via the bus 245. The board interface 220 is coupled to the host interface 260 via the bus 240. The host interface 260 is not limited to a particular interface and may vary in different embodiments. For example, in one illustrative embodiment, the host interface 260 is a PCIe connector. It should be appreciated that the main board 301 and the configuration of interfaces 220 and 260 and busses 240, 245, 250, and 251 are shown for illustrative purposes and that other implementations may be realized without compromising the underlying principles of the present disclosure.

Figure 3:
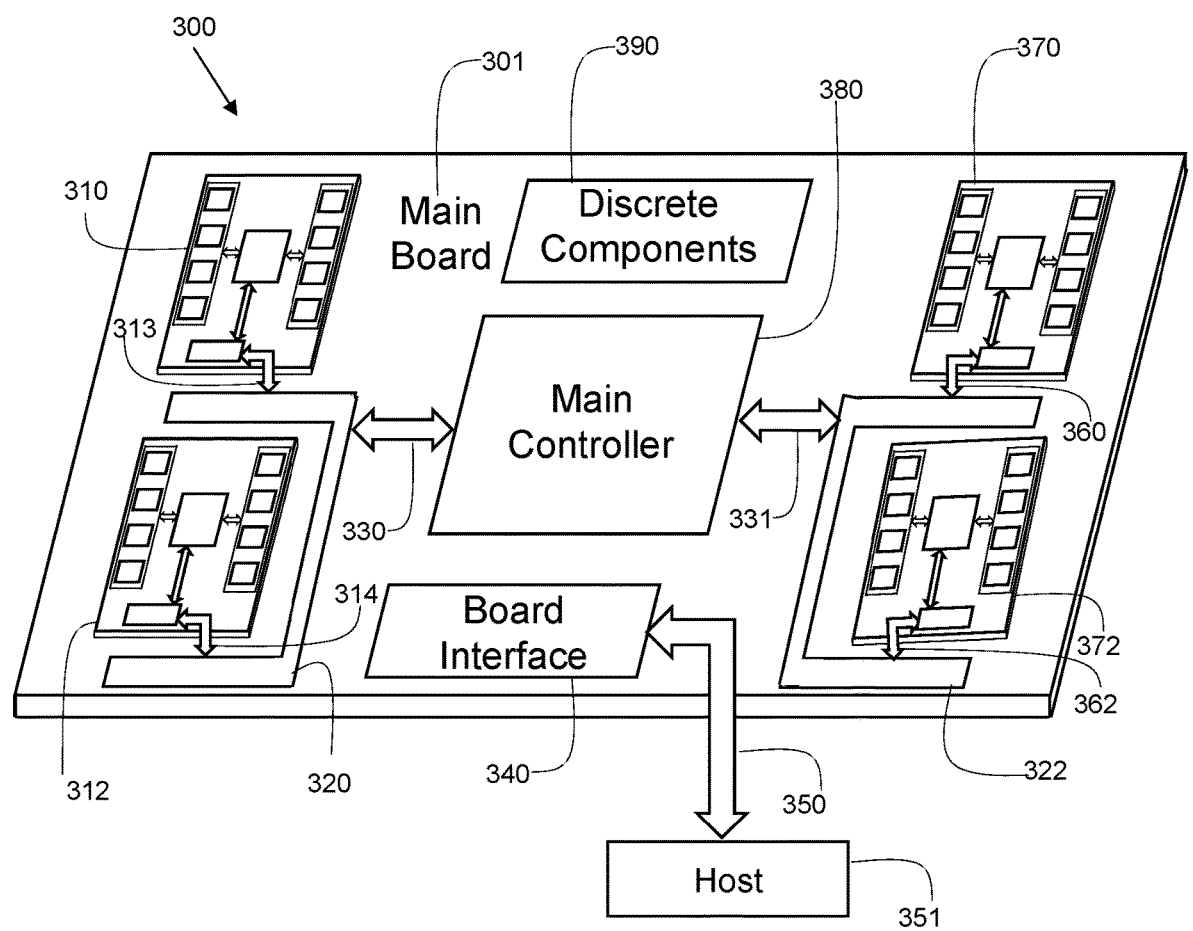
FIG. 3 illustrates a block diagram of an exemplary storage system having a distributed control architecture to program memory, according to an embodiment.

The memory modules 270, 271, 272 and 273 can be mounted directly on the main board 201 of FIG. 2. In another embodiment, memory card modules can be attached to the main board 201 via ribbons, such as illustrated in FIG. 3. The control of the various memory banks is transparent to the host or server. The distributed controllers 210, 211, 212, and 213 shown in FIG. 2 can implement error correction and are shown including error correction code (ECC) engines 284, 285, 286, and 287, respectively. The distributed controllers 210, 211, 212, and 213 may be configured to support ECC and memory management schemes specific to the technology used by the memory modules 270, 271, 272, and 273. The memory devices 241, 242, 243, and 244 are illustrative examples of memory devices used in the memory banks 230, 231, 232, 233, 234, 235, 236, and 237. In one embodiment, the main controller 280 can also include an encoder 282 that may perform encoding (e.g., error correction) on data. The number of memory devices implemented in a memory bank is not restricted to the number shown in FIG. 2. Other embodiments may include a different number of memory devices in each memory bank of each memory module. The discrete components 290 can consist of passive components such as capacitors, resistors, inductors, as well as active components such as diodes, transistors, etc. This list of components is an illustrative list and not an exhaustive list.

FIG. 3 illustrates a block diagram of an exemplary storage system having a distributed controller architecture to program memory based on a programming scheme, according to an embodiment. The storage system shown in FIG. 3 illustrates a specific implementation of the storage system 200 shown in FIG. 2, where the memory modules 220, 211, 212, and 213 are specifically implemented as memory cards (or memory card modules) that may couple to the main board. It should be appreciated that the discussion above for similar features and function of the storage system 200 of FIG. 2 may also apply to the storage system shown in FIG. 3. For the sake of brevity and clarity, every feature and function applicable to FIG. 3 is not repeated in FIG. 3 or here.

In FIG. 3, a storage system 300 is shown including a main board 301. The main board 301 contains a discrete components 390, a main controller 380, a board interface 340, and four memory cards (or memory card modules) 310, 312, 370, and 372, The memory card 310, the memory card 312, the memory card 370 and the memory card 372 are connected to the main board 301 through a connector (or connection) 313, a connector 314, a connector 360 and a connector 362, respectively. The connectors 313, 314, 360 and 362 can be ribbon connectors or other physical connectors. The main controller 380 communicates to the memory cards 310 and 312 and memory cards 370 and 372 through connecting a bus 320 and a bus 322, respectively. The bus 320 and the bus 322 interface to the main controller 380 through a bus 330 and a bus 331, respectively. The main controller 380 coordinates the operation of the memory card modules 310, 312, 370, and 372.

The memory cards 310, 312, 370, and 372 can function independently with respect to supported technology. The memory cards 310, 312, 370, and 372 mounted on the main board 301 can be different from one another, in the sense that each of memory card 310, 312, 370, and 372 can support a different memory technology from one another on the main board 301. It should be appreciated that one or more of the memory cards 310, 312, 370, and 371 can also support the same memory technology if desired.

The main controller 380 is also responsible for the management of communications to a host 351, and may communicate with the host 351 via the board interface 340. The board interface 340 may be coupled to the host 351 in accordance with a removable universal serial bus (USB) configuration or any other protocol, such as PCIe, SATA, SAS, or a proprietary protocol. The main controller 380 is also responsible for the memory management of the memory devices in the memory cards 310, 312, 370, and 372.

The memory cards 310, 312, 370 and 372 can be configured to function independently to support different memory technologies. For example, the memory card 310 can support 2D Flash, the memory card 312 can support ReRAM, the memory card 370 can support 3D Flash, and the memory card 372 can support 2D Flash from a different technology node then the memory card 310. All of these memory cards can be mounted on the same main board 301 and operate independently under supervision of the main controller 380. The memory cards 310, 312, 370 and 372 may include one or more memory dies. The memory cards 310, 312, 370 and 372 may include, for example, 2D-Flash, 3D-Flash, ReRAM, MRAM, any other non-volatile or volatile memory technology, or combination thereof.

The discrete components 390 consist of passive components such as capacitors, resistors, inductors, as well as active components such as diodes, transistors, etc. This list of components is an illustrative list and not an exhaustive list.

In an embodiment, the storage system 300 in FIG. 3 may include (or correspond to) a solid-state drive (SSD), which may be included in, or distinct from (and accessible to), the host 351. For example, the storage system 300 in FIG. 3 may include an SSD, which may be used as an embedded storage drive (e.g., a mobile embedded storage drive), an enterprise storage drive (ESD), a client storage device, or a cloud storage drive, as illustrative, non-limiting examples. In an embodiment, the storage system 300 in FIG. 3 may be coupled to the host 351 indirectly, e.g., via a network. For example, the network may include a data center storage system network, an enterprise storage system network, a storage area network, a cloud storage network, a local area network (LAN), a wide area network (WAN), the Internet, and/or another network. In an embodiment, the storage system 300 of FIG. 3 may be a network-attached storage (NAS) device or a component (e.g., an SSD device) of a data center storage system, an enterprise storage system, or a storage area network.

The host 351 may include a processor and a memory (not shown in FIG. 3). The memory may be configured to store data and/or instructions that may be executable by the processor (or microprocessor). The memory may be a single memory or may include multiple memories, such as one or more non-volatile memories, one or more volatile memories, or a combination thereof. The host 351 may issue one or more commands to the storage system 300, such as one or more requests to erase data, read data from, or write data to the memory cards 310, 312, 370, and 372 of the storage system 300. The host 351 may include a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof, as illustrative, non-limiting examples. An exemplary host is provided and discussed in FIG. 5.

Figure 4:
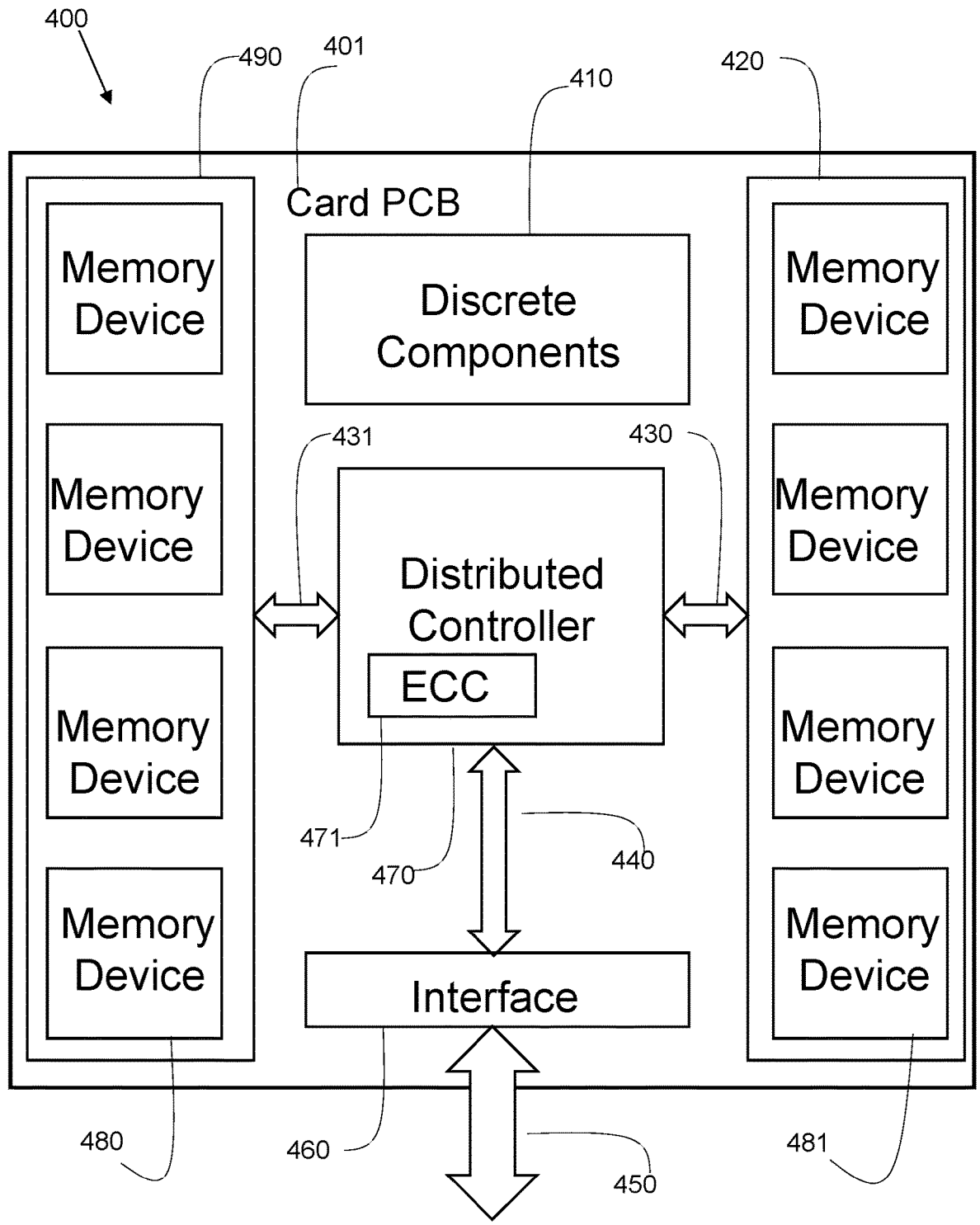
FIG. 4 illustrates a block diagram of an exemplary memory card module having a distributed controller, according to an embodiment.

FIG. 4 illustrates an exemplary data storage device having a distributed controller, according to an embodiment. In FIG. 4, a data storage device 400 (or memory module 400) is shown including a distributed controller 470 coupled to memory banks 420 and 490. The memory banks 420 and 490 are shown including memory devices, of which a memory device 481 is a representative memory device in the memory bank 420 and a memory device 480 is a representative memory device in the memory bank 490. The number of memory devices is not limited to four. For illustrative purposes, only four memory devices are shown in FIG. 4. In one embodiment, the data storage device 400 may be implemented as one of the memory modules of FIG. 2 or one of the memory cards of FIG. 3. The data storage device 400 is also shown including discrete components 410, an interface (or interface module) 460, and connections (e.g., busses) 431, 430, 440, and 450. The discrete components 410 can consist of passive components such as capacitors, resistors, inductors, as well as active components such as diodes, transistors, etc. This list of components is an illustrative list and not an exhaustive list.

The distributed controller 470 manages the programming of memory devices 480 and 481 in the memory banks 420 and 490, respectively. The number of memory banks is not limited to two. For illustrative purposes, only two memory banks 420 and 490 are shown in FIG. 4. The memory banks can exist on one side of a PCB, or on both sides of a double-sided PCB. The memory banks can also be stacked on top of one another in other embodiments. The distributed controller 470 implements the ECC requirements and the memory management schemes pertinent to the specific memory technology of the memory devices. The interface 460 is connected to a main board, such as the main board 301 of FIG. 3, with the connector 450 (e.g., ribbon connector). In the example configuration of FIG. 3, the connector 450 can refer to one or more of the connectors 313, 314, 360 and 362.

The memory devices 480 and 481 in the respective memory banks 490 and 420 of the memory card 400 of FIG. 4 may include one or more memory dies (e.g., one memory die, two memory dies, eight memory dies, or another number of memory dies). The memory devices 480 and 481 includes memory, such as a non-volatile memory of storage elements included in a memory die of the memory devices 480 and 481. For example, the memory may include a flash memory, such as a NAND flash memory, or a resistive memory, such as a resistive random access memory (ReRAM), as illustrative, non-limiting examples. In an embodiment, the memory may have a three-dimensional (3D) memory configuration. As an example, the memory may have a 3D vertical bit line (VBL) configuration. In an embodiment, the memory may be a non-volatile memory having a 3D memory configuration that is monolithically formed in one or more physical levels of arrays of memory cells having an active area disposed above a silicon substrate. Alternatively, the memory may have another configuration, such as a two-dimensional (2D) memory configuration, a monolithic 3-D memory, or a non-monolithic 3D memory configuration (e.g., a stacked die 3D memory configuration). A memory may be configurable to operate as a single-level-cell (SLC) word line, a multi-level-cell (MLC) word line, a tri-level-cell (TLC) wordline, or a quad-level cell (QLC), as illustrative, non-limiting examples. QLC It should be appreciated that the memory devices 480 and 481 may include supporting circuitry, such as read/write circuitry, to support operation of one or more memory dies of the memory card module 400. Although depicted as a single component, the read/write circuitry may be divided into separate components of the memory devices 480 and 481, such as read circuitry and write circuitry. The read/write circuitry may be external to the one or more dies of the memory devices 480 and 481. Alternatively, one or more individual memory dies of the memory devices 480 and 481 may include corresponding read/write circuitry that is operable to read data from and/or write data to storage elements within the individual memory die independent of any other read and/or write operations at any of the other memory dies. Each of the memory banks 420 and 490 can have more than a single memory device (e.g., the memory devices 480 and 481) and can include memory devices of one or more technologies. For illustrative purposes, references are made to only memory devices 480 and 481.

The distributed controller 470 is shown coupled to the memory banks 420 and 490 via the connections 430 and 431, which can be a bus, an interface, another structure, or a combination thereof. For example, the connections 430 and 431 can be a bus that includes one or more channels to enable the distributed controller 470 to communicate with a single memory die of the respective memory banks 420 and 490. As another example, the connections 430 and 431 can be a bus that includes multiple distinct channels to enable the distributed controller 470 to communicate with each memory die of the memory devices 480 and 481 in parallel with, and independently of, communication with other memory dies of the memory devices 480 and 481. The distributed controller 470 can receive data and instructions from a main board and to send data to the main board via the interface 460 and connection 450. For instance, in the example configuration shown in FIG. 3, the distributed controller 470 can send data to the main board 301 of FIG. 3 via the interface 460 and connection 450, and the distributed controller 470 can receive data from the main board 301 of FIG. 3 via the interface 460 and connection 450. The distributed controller 470 can send data and commands to the memory banks 420 and 490 and to receive data from the memory banks 420 and 490. The distributed controller 470 is configured to send data and a write commands to cause the memory banks 420 and 490 to store data to an address of the memory banks 420 and 490. For example, the write command may specify a physical address of a portion of the memory bank 420 and 490 (e.g., a physical address of a word line of the memory devices, such as memory devices 480 and 481) that is to store the data. The distributed controller 470 can also send data and commands to the memory banks 420 and 490 associated with background scanning operations, garbage collection operations, and/or wear leveling operations, etc., as illustrative, non-limiting examples. The distributed controller 470 can be configured to send a read command to the memory banks 420 and 490 to access data from a specified address of the memory banks 420 and 490. The read command may specify the physical address of a portion of the memory devices (e.g., a physical address of a word line of the memory devices such as 480 and 481).

In the embodiment shown in FIG. 4, the distributed controller 470 includes an error correction code (ECC) engine module 471. The distributed controller 470 can be configured to support ECC and memory management schemes specific to the technology used by the memory devices 480 and 481. The memory devices 480 and 481 are an illustrative example of memory devices used in the memory banks 420 and 490. The number of such memory devices 480 and 481 used in the memory banks is not restricted to the number shown in the description for the memory banks 420 and 490.

The ECC engine 471 in FIG. 4 can include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples. The ECC engine 471 can also include a decoder that decodes the incoming data packet, identify errors that must be corrected, and generate the error count information needed to measure the health of the wordline, block, or device.

Exemplary Host Embodiment

Figure 5:
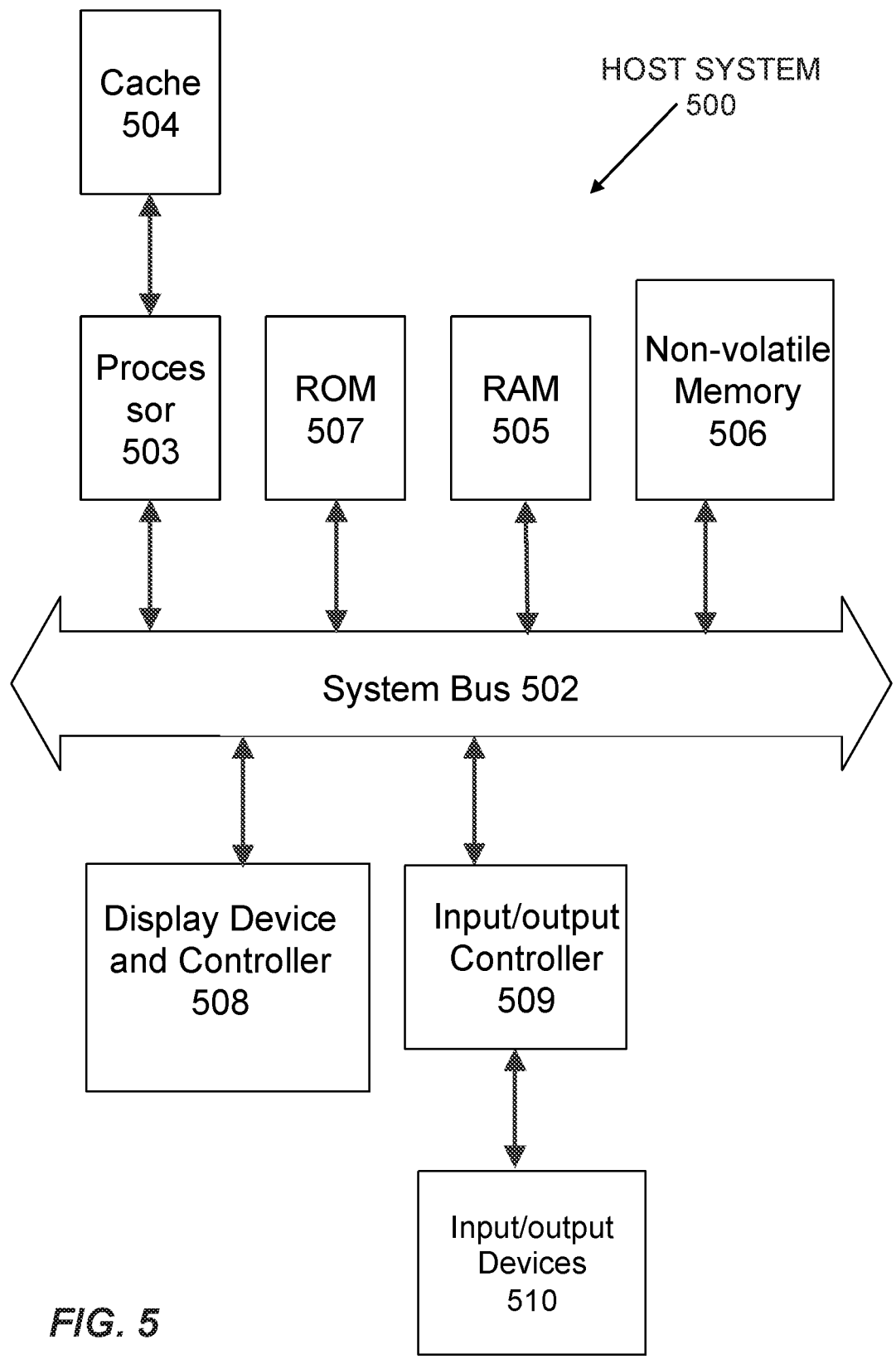
FIG. 5 illustrates a block diagram of an exemplary host, according to an embodiment.

FIG. 5 depicts a block diagram of an exemplary host system (or data processing system), according to an embodiment. The host system may also be referred to herein as a "host" or "host device". Note that while FIG. 5 illustrates various components of a host system, it is not intended to represent any particular architecture or manner of interconnecting the components. It is also be appreciated that networked computers and other data processing systems which have fewer components, or perhaps more components, may also be implemented as the host system As shown, the host system 501 includes a system bus 502, which is coupled to a microprocessor 503, a Read-Only Memory (ROM) 507, a volatile Random Access Memory (RAM) 505, as well as other nonvolatile memory 506. In the illustrated embodiment, microprocessor 503 is coupled to cache memory 504. A system bus 502 can be adapted to interconnect these various components together and also interconnect components 503, 507, 505, and 506 to other devices, such as a display controller and display device 508, and to peripheral devices such as input/output ("I/O") devices 510. Types of I/O devices can include keyboards, modems, network interfaces, printers, scanners, video cameras, or other devices well known in the art. Typically, I/O devices 510 are coupled to the system bus 502 through I/O controllers 509. In one embodiment the I/O controller 509 includes a Universal Serial Bus ("USB") adapter for controlling USB peripherals or other type of bus adapter.

RAM 505 can be implemented as dynamic RAM ("DRAM"), which requires power continually in order to refresh or maintain the data in the memory. The other nonvolatile memory 506 can include a magnetic hard drive, magnetic optical drive, optical drive, DVD RAM, solid-state storage drive, or other type of memory system that maintains data after power is removed from the system. While FIG. 5 shows that nonvolatile memory 506 as a local device coupled with the rest of the components in the host system 500, it will be appreciated by skilled artisans that the described techniques may use a nonvolatile memory remote from the system, such as a network storage device coupled with the host system through a network interface, such as a modem, Ethernet interface, or any other standard or proprietary interface.

For example, with respect to the storage systems shown in FIGS. 2 and 3, the host system 500 can communicate with storage systems via the interfaces 220 and 240 of FIG. 2, or the interfaces 340 and 350 of FIG. 3. The interfaces 240 and 350 may be a PCIe, SATA, USA or any other standard or proprietary interface. The main controllers 280 or 380 of respective FIGS. 2 and 3 can manage the communication to the host system 500, the access to the NVM, and the memory management software.

Exemplary Methods of Distributed Control

Figure 6:
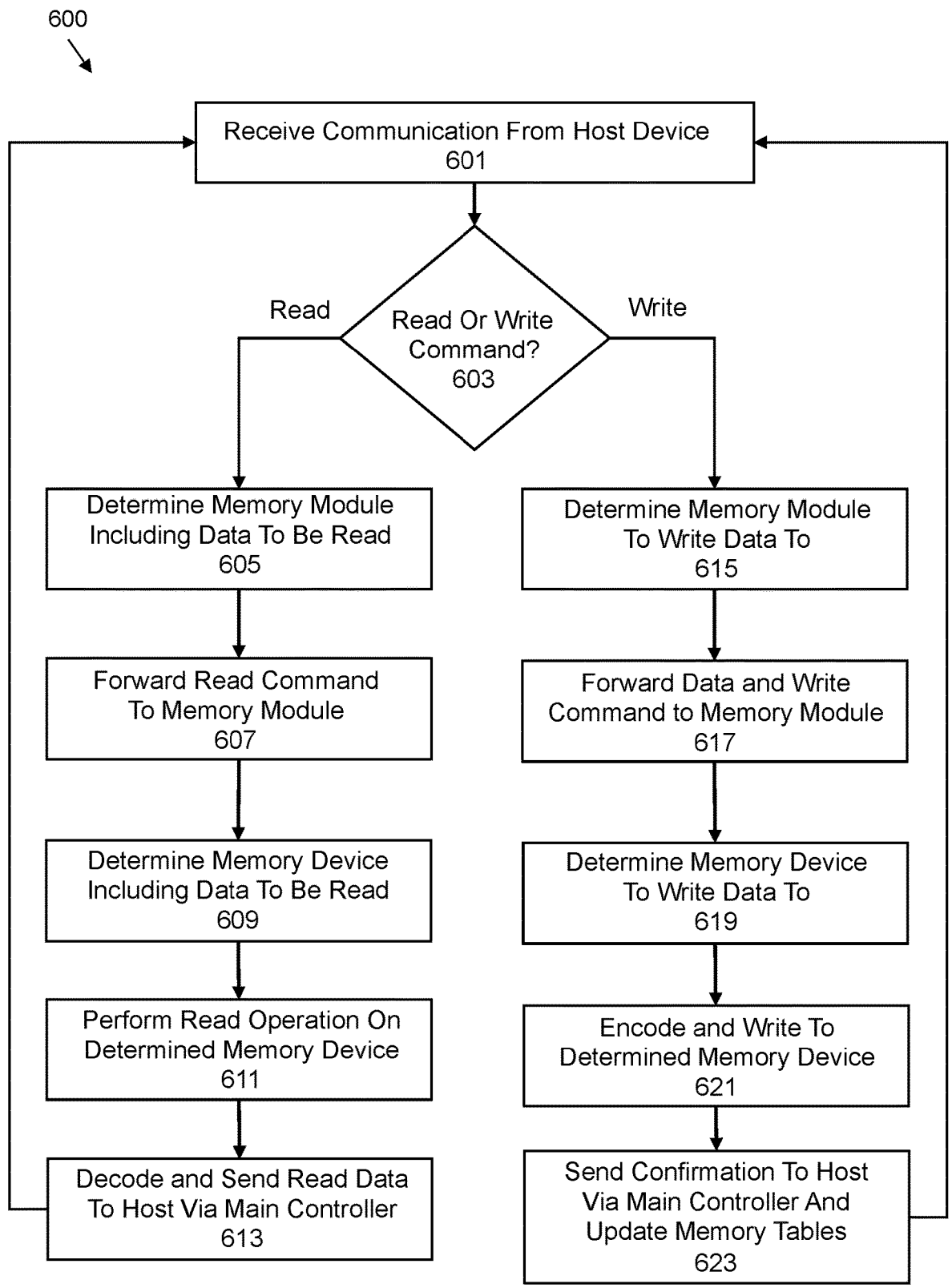
FIG. 6 illustrates a flow chart for an exemplary method for providing distributed data control in a data storage device or storage system, according to an embodiment.

FIG. 6 illustrates a flow chart for an exemplary method or process for providing distributed data control in a data storage device or storage system, according to an embodiment. In one embodiment, the data storage device or storage system may be implemented as one of the data storage devices and storage systems shown in FIGS. 2-4. It should be appreciated that the discussion above for the storage systems 200 and 300 of FIGS. 2 and 3 respectively, as well as the data storage device 400 of FIG. 4, may also apply to the method described in FIG. 6. For the sake of brevity and clarity, every feature and function applicable to FIGS. 2-4 are not repeated here. While the method 600 of FIG. 6 is described with respect to the systems and devices shown in FIGS. 2-4, it should be appreciated that the method may apply to other storages systems and devices in other embodiments without compromising the underlying principles of the present disclosure.

In FIG. 6, at block 601 of method 600, a main controller (e.g., the main controllers 280, 380 and 470 FIGS. 2-4) receives a communication (or instructions) from a host (e.g., the host 351). The communication may include for example, data along with a command to write the data into one or more memory modules (e.g., the memory modules 270, 271, 272, 273, and 274 of FIG. 2; the memory modules 310, 312, 370, and 373 of FIG. 3, and the memory module 400 of FIG. 4) of a storage system (e.g., the storage systems 200 and 300 of FIGS. 2 and 3). The write command may include a logical address, for example, in which the data is stored. The communication may also include a command to read specific data from one or more memory devices of the storage system.

At block 603, the main controller determines whether the communication is a read or write command (or request). If the host communication is a read command, then at block 605, the distributed controller determines which memory module includes the data to be read. For example, the read command from the host may be accompanied with the logical address associated with the stored data. Based on the logical address, the main controller can then determine which memory module coupled to the main controller has the data is stored therein. For instance, in an exemplary embodiment, the main controller can maintain a memory table that tracks any stored data, associated logical addresses, and associated memory modules in which the data is stored. In one embodiment, the memory table can also track the physical addresses associated with the various memory devices in the memory modules coupled to the main controller, as well as any memory technologies that are implemented in the various memory modules or memory devices.

At block 607, the main controller forwards the host communication (e.g., the read command) to the memory module determined in block 605. The distributed controller of the memory module receives the read command and then, at block 609, determines which memory device includes the data to be read. For example, based on the logical address, the distributed controller can then identify the physical address and corresponding memory device in which the data is stored. For instance, in an exemplary embodiment, the distributed controller may maintain its own memory table (e.g., a logical to physical address table) that tracks any stored data, its associated logical addresses, and associated physical addresses in which the data is stored. The memory table can also track which physical addresses are associated with the various memory devices coupled to the distributed controller, as well as any memory technologies that are implemented in the various memory devices.

At block 611, the distributed controller performs a read operation on the memory device determined in block 609 to retrieve the requested data For example, a read operation may be initiated for the physical address identified as associated with the logical address of the requested data. Once the requested data is read at block 611, the distributed controller can decode and send the read data to the main controller, which receives and forwards to the host, as represented by block 613. The distributed controller can include, for example, a decoder that decodes incoming data packets, identifies errors that must be corrected, and generates error count information needed to measure the health of the wordline, block, or device. The process may be repeated for additional host communications received by the main controller, as represented by the arrow from block 613 to block 601.

If, at block 603, the host communication is determined to be a write command, then the main controller determines which memory module to store the data, as represented by block 615. For example, the main controller may determine the appropriate memory module based on which memory module has free memory devices available to store the data. In one embodiment, the main controller can determine which memory device to store the data based on the data, such as whether the data is determined to be "hot" or "cold" data For example, the main controller can reference the memory table to determine if any memory modules include associated memory technologies are appropriate for the "hot" or "cold" data, as well as which memory modules have memory devices with the desired memory technology implemented.

At block 617, the main controller forwards the host communication (e.g., the data and write command) to the memory module determined in block 615. The distributed controller of the memory module receives the data and write command and then, at block 619, determines which memory device to write the data to. For example, the distributed controller may determine the appropriate memory device based on which memory device has free memory available to store the data. In one embodiment, the distributed controller can determine which memory device to store the data based on the data, such as whether the data determined to be "hot" or "cold" data. For example, the distributed controller can reference its own memory table to determine which memory technologies are appropriate for the "hot" or "cold" data, as well as which memory devices have the desired memory technology implemented.

At block 621, the distributed controller encodes and writes the data to the memory device determined in block 619. For example, a write operation may be initiated for the physical address identified as associated with the memory device determined in block 619. The distributed controller can perform error correction during the writing of the data into the memory device. For instance, the distributed controller can be configured to include one or more ECC encoders specific to the various memory technologies of the memory devices. The various ECC encoders can be utilized to perform error correction on the data according to the corresponding ECC techniques of the ECC encoders.

At block 623, once the data is written to the memory device, the distributed controller may send confirmation to the main controller that the data has been written to the memory device, and then update its memory table to reflect which physical address the data was stored in. The main controller may then send confirmation to the host that the data has been written to the memory device, and may also update its memory table to reflect which memory module the data was stored in. In one embodiment, the main controller may also update its memory table to reflect which memory device and physical address the data was stored in. The process may then be repeated for additional host communications received by the distributed controller, as represented by the arrow from block 623 to block 601.

It should be appreciated that in other embodiments, the main controller can be configured to also include an encoder, decoder, or both. In this way, the main controller and the distributed controller can be configured to encode or decode data that is sent or received. In one embodiment, the main controller and the distributed controller can be configured to perform error correction on data that is sent or received. For example, the main controller and the distributed controller can be configured to include one or more ECC encoders specific to the various memory technologies of the memory modules or memory devices. The ECC encoders can be configured to perform error correction on any data sent or received by the main controller and the distributed controller, such as data sent or received between the host and main controller, data sent or received between the main controller and the distributed controller, and data sent or received between the distributed controller and the memory devices.

Exemplary Embodiments

In certain aspects of the present disclosure, a solid-state drive (SSD) is provided that includes a controller and one or more non-volatile memory devices. The SSD architecture utilizes a distributed control architecture and enables a hybrid technology SSD that uses memory card modules, which can be of different technologies and have technology specific requirements for ECC and memory management schemes.

In certain aspects of the present disclosure, a data storage device is provided that includes a distributed controller configured to communicate with a main controller; a first memory device of a first non-volatile memory technology; and a second memory device of a second non-volatile memory technology that is different than the first non-volatile memory technology. The first memory device and the second memory device are coupled to the distributed controller. The distributed controller is configured to control access to the first and second memory devices.

In certain embodiments, the data storage device also includes at least one additional memory device of a different non-volatile memory technology than the first and second non-volatile memory technologies.

In certain embodiments, the data storage device also includes the main controller coupled to the distributed controller. The main controller is configured to control access to the distributed controller.

In certain embodiments, the first memory device includes at least one memory die.

In certain embodiments, the first and second memory devices are configured in at least one memory bank coupled to the distributed controller.

In certain embodiments, the first and second non-volatile memory technologies are selected from a group consisting of: 2D flash memory, 3D flash memory, resistive random access memory, and magnetoresistive random-access memory.

In certain embodiments, the first and second non-volatile memory technologies have different raw bit error rates.

In certain embodiments, the distributed controller is configured to provide a first type of error correction to the first memory device of the first non-volatile memory technology and a second type of error correction to the second memory device of the second non-volatile memory technology. The first type of error correction is different than the second type of error correction. In one embodiment, the distributed controller includes at least one encoder that is selected from a group consisting of a Reed-Solomon encoder, a Bose-Chaudhuri-Hocquenghem (BCH) encoder, a low-density parity check (LDPC) encoder, or a turbo encoder In certain embodiments, the data storage device is a memory card including: a printed circuit board (PCB); and an interface module configured to connect to a main board having the main controller so as to enable the main controller to control access to the distributed controller. The distributed controller and the first and second memory devices are coupled to the PCB. The first and second memory devices are configured in at least one memory bank coupled to the distributed controller. The distributed controller is configured to provide a first type of error correction to the first memory device of the first non-volatile memory technology and a second type of error correction to the second memory device of the second non-volatile memory technology. The first type of error correction is different than the second type of error correction.

In certain embodiments, the data storage device also includes at least one bus coupling the at least one memory bank to the distributed controller. The at least one bus includes distinct channels to enable the distributed controller to independently communicate in parallel with each memory die of the first and second memory devices.

In certain aspects of the present disclosure, a system is provided that includes a main controller; a first distributed controller coupled to the main controller; at least one first memory device coupled to the first distributed controller; a second distributed controller coupled to the main controller; and at least one second memory device coupled to the second distributed controller. The main controller is configured to control access to the first distributed controller and to the second distributed controller. The first distributed controller is configured to control access to the at least one first memory device. The second distributed controller is configured to control access to the at least one second memory device. The at least one first and second memory devices include at least two non-volatile memory technologies.

In certain embodiments, the at least two non-volatile memory technologies are selected from the group consisting of: 2D flash memory, 3D flash memory, resistive random access memory, and magnetoresistive random-access memory.

In certain embodiments, the at least one first memory device includes a plurality of memory devices configured in at least one memory bank coupled to the first distributed controller. In one embodiment, the at least one memory bank includes a first memory bank configured with a first non-volatile memory technology; and a second memory bank configured with a second non-volatile memory technology that is different than the first non-volatile memory technology.

In certain embodiments, the at least one first memory device includes a plurality of memory devices configured in a first plurality of memory banks coupled to the first distributed controller. The first plurality of memory banks includes a first memory bank configured with a first non-volatile memory technology. The at least one second memory device includes a plurality of memory devices configured in a second plurality of memory banks coupled to the second distributed controller. The second plurality of memory banks includes a second memory bank configured with a second non-volatile memory technology that is different than the first non-volatile memory technology.

In certain embodiments, the main controller is configured to receive a read or write command from a host. In one embodiment, the system also includes the host. The host includes at least one processor in communication with the main controller. The host is configured to send read or write commands to the main controller for storage in the at least one first and second memory devices.

In certain embodiments, the system also includes: a third distributed controller coupled to the main controller; and at least one third memory device coupled to the third distributed controller. The third distributed controller is configured to control access to the at least one third memory device.

In certain embodiments, the main controller, the first and second distributed controllers, and the at least one first and second memory devices are coupled to a main board. In one embodiment, the first distributed controller and the at least one first memory device are coupled to a first memory card. The first memory card is removably coupled to the main board. The second distributed controller and the at least one second memory device are coupled to a second memory card. The second memory card is removably coupled to the main board. The first and second memory cards are configured to operate independently under control of the main controller.

In one embodiment, the first memory card is configured for a first non-volatile memory technology and the second memory card is configured for a second non-volatile memory technology that is different than the first non-volatile memory technology.

In certain embodiments, the system includes a solid-state drive.

In certain embodiments, the first distributed controller is configured to provide a first type of error correction to the at least one first memory device of the first non-volatile memory technology. The second distributed controller is configured to provide a second type of error correction to the at least one second memory device of a second non-volatile memory technology that is different than first type of error correction.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without all of these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

Various components and modules described herein may include software, hardware, or a combination of software and hardware. The components and modules may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) may be provided via an article of manufacture including a non-transitory, tangible computer or machine readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof.

In an implementation, the processes and features described herein may be implemented as a series of executable modules run by a processor (e.g., in a computer system, individually or collectively in a distributed computing environment). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment.

A computer or machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A solid-state storage drive comprising:
   a main controller configured to receive read and write commands from a host device;
   a first memory module comprising a first distributed controller coupled to a first plurality of memory devices, wherein the first distributed controller is configured to control access to the first plurality of memory devices, and wherein the first plurality of memory devices comprises a first memory device and a second memory device;
   a second memory module comprising a second distributed controller coupled to a second plurality of memory devices, wherein the second distributed controller is configured to control access to the second plurality of memory devices, and wherein the second plurality of memory devices comprises a third memory device;
   wherein the main controller is configured to control access to the first and second memory modules;
   a first bus and a second bus coupled to the main controller;
   wherein the first distributed controller is coupled to the main controller and the first bus, and wherein the main controller is configured to control access to the first distributed controller via the first bus;
   a third bus and a fourth bus coupled to the first distributed controller;
   wherein the first memory device is coupled to the first distributed controller and the third bus
   wherein the second memory device is coupled to the first distributed controller and the fourth bus;
   wherein the first distributed controller is configured to control access to the first and second memory devices via the respective third and fourth busses such that the first distributed controller is enabled to perform reads from and writes to the first and second memory devices in parallel simultaneously via the respective third and fourth busses;
   a second distributed controller coupled to the main controller and the second bus, wherein the main controller is configured to control access to the second distributed controller via the second bus; and
   a fifth bus coupled to the second distributed controller;
   wherein the third memory device is coupled to the second distributed controller and the fifth bus, wherein the second distributed controller is configured to control access to the third memory device via the fifth bus;
   wherein the main controller and the first and second distributed controllers of the solid-state drive are configured such that the solid-state drive is enabled to perform reads from and writes to the first, second, and third memory devices in parallel simultaneously via the first, second, third, fourth, and fifth busses;
   wherein the main controller and the first distributed controller are configured to perform reads from and writes to the first memory device via a first communication path comprising the first bus and the third bus;
   wherein the main controller and the first distributed controller are configured to perform reads from and writes to the second memory device via a second communication path comprising the second bus and the fourth bus;
   wherein the main controller and the second distributed controller are configured to perform reads from and writes to the third memory device via a third communication path comprising the second bus and the fifth bus;
   wherein the first, second, and third communication paths are different;
   wherein the first plurality of memory devices comprises more than one non-volatile memory technology;
   wherein the first memory device comprises three dimensional (3D) non-volatile memory technology selected from the group consisting of: single-level cell (SLC) flash, multi-level cell (MLC) flash, SLC resistive random-access memory (ReRAM), and MLC ReRAM;
   wherein the second memory device comprises 3D non-volatile memory technology selected from the group consisting of: triple-level cell (TLC) and quadruple-level cell (QLC);
   wherein the main controller is configured to:
     track memory technologies implemented in the first and second memory modules;
     track memory technologies implemented in the first, second, and third memory devices; and
     send data to the first and second memory modules based on:
       the tracked memory technologies implemented in the first and second memory modules;
       the tracked memory technologies implemented in the first, second, and third memory devices; and
       determined frequencies that the data is to be accessed; and
   wherein the first distributed controller is configured to:
     track memory technologies implemented in the first plurality of memory devices;
     store data in the first and second memory devices based on:
       the tracked memory technologies implemented in the first plurality of memory devices; and
       determined frequencies that the data is to be accessed; and in response to storing data in the first and second memory devices, send confirmation to the main controller indicating in which of the first and second memory devices the data was stored.

2. The solid-state storage drive of claim 1, wherein the main controller is configured to:
receive a command from the host device to store a data packet;
partition the data packet into a plurality of portions; and
simultaneously send the plurality of portions to the first and second distributed controller for storage in the first and second memory modules such that the plurality of portions are interleaved across the first, second, and third memory devices.

3. The solid-state storage drive of claim 1, wherein the first plurality of memory devices comprises a third plurality of memory devices coupled to the first distributed controller and the third bus, wherein the third plurality of memory devices comprises the first memory device, wherein the first distributed controller is configured to control access to the third plurality of memory devices via the third bus, wherein the third bus comprises multiple distinct channels, and wherein the first distributed controller is configured to communicate with each memory die in the third plurality of memory devices independently and in parallel via the multiple distinct channels of the third bus.

4. The solid-state storage drive of claim 3, wherein the third plurality of memory devices comprises more than one non-volatile memory technology selected from the group consisting of: 2D flash memory, 3D flash memory, ReRAM, and magnetoresistive random-access memory.

5. The solid-state storage drive of claim 3, wherein the first plurality of memory devices comprises a fourth plurality of memory devices coupled to the first distributed controller and the fourth bus, wherein the fourth plurality of memory devices comprises the second memory device, wherein the first distributed controller is configured to control access to the fourth plurality of memory devices via the fourth bus, wherein the fourth bus comprises multiple distinct channels, and wherein the first distributed controller is configured to communicate with each of memory die in the third and fourth pluralities of memory devices independently and in parallel via the multiple distinct channels of the third and fourth busses.

6. The solid-state storage drive of claim 5, wherein the first memory device and the second memory device are different non-volatile memory technologies;
wherein the first memory device comprises non-volatile memory technology selected from the group consisting of: 2D flash memory, 3D flash memory, and ReRAM; and
wherein the second memory device comprises non-volatile memory technology selected from the group consisting of: 2D flash memory and 3D flash memory.

7. The solid-state storage drive of claim 1, wherein the first memory device comprises a first plurality of memory dies, wherein the third bus comprises multiple distinct channels, and wherein the first distributed controller is configured to communicate with each of the memory dies in the first plurality of memory dies independently and in parallel via the multiple distinct channels of the third bus.

8. The solid-state storage drive of claim 7, wherein the first memory device comprises non-volatile memory technology selected from the group consisting of: 2D flash memory, 3D flash memory, and ReRAM.

9. The solid-state storage drive of claim 7, wherein the second memory device comprises a second plurality of memory dies, wherein the fourth bus comprises multiple distinct channels, and wherein the first distributed controller is configured to communicate with each of the memory dies in the first and second pluralities of memory dies independently and in parallel via the multiple distinct channels of the third and fourth busses.

10. The solid-state storage drive of claim 9, wherein the first memory device comprises non-volatile memory technology selected from the group consisting of: 2D flash memory, 3D flash memory, and ReRAM;
wherein the first memory device and the second memory device are different non-volatile memory technologies; and
wherein the second memory device comprises non-volatile memory technology selected from the group consisting of: 2D flash memory and 3D flash memory.

11. The solid-state storage drive of claim 1, wherein the first memory device comprises a plurality of memory dies, and wherein each memory die of the plurality of memory dies comprises read and write circuitry configured to read data from and write data to storage elements within the respective memory die independent of other read and write operations at other memory dies in the plurality of memory dies.

12. The solid-state storage drive of claim 11, wherein the first memory device and the second memory device are different non-volatile memory technologies;
wherein the first memory device comprises non-volatile memory technology selected from the group consisting of: 2D flash memory, 3D flash memory, and ReRAM; and
wherein the second non-volatile memory device comprises non-volatile memory technology selected from the group consisting of: 2D flash memory and 3D flash memory.

13. The solid-state storage drive of claim 1, wherein the main controller is configured to:
receive a command from the host to store a data packet;
partition the data packet into a plurality of portions, wherein the plurality of portions comprises a first portion and a second portion; and
simultaneously send in parallel:
the first portion to the first distributed controller via the first bus for storage; and
the second portion to the second distributed controller via the second bus for storage;
wherein the first distributed controller is configured to:
receive the first portion from the main controller; and
write the first portion across the first and second memory devices via the third and fourth busses, respectively;
wherein the second distributed controller is configured to:
receive the second portion from the main controller; and
write the second portion to the third memory device via the fifth bus; and
wherein the data packet is interleaved across the first, second, and third memory devices.

14. The solid-state storage drive of claim 1, wherein the main controller is configured to reference a first memory table to determine:
the tracked memory technologies implemented in the first and second memory modules; and
the tracked memory technologies implemented in the first, second, and third memory devices;

wherein the sending of the data to the first and second memory modules by the main controller is based on the referencing of the first memory table;
wherein the first distributed controller is configured to reference a second memory table to determine the tracked memory technologies implemented in the first plurality of memory devices; and
wherein the storing of the data in the first and second memory devices by the first distributed controller is based on the referencing of the second memory table.

15. A method of managing data in a solid-state storage drive, the method comprising:
receiving, at a main controller of the solid-state storage drive, a write command from a host device to store a data packet, wherein the solid-state storage drive comprises:
the main controller configured to receive read and write commands from the host device;
a first memory module comprising a first distributed controller coupled to a first plurality of memory devices, wherein the first distributed controller is configured to control access to the first plurality of memory devices, wherein the first plurality of memory devices comprises a first memory device and a second memory device;
a second memory module comprising a second distributed controller coupled to a second plurality of memory devices, wherein the second distributed controller is configured to control access to the second plurality of memory devices, and wherein the second plurality of memory devices comprises a third memory device;
wherein the main controller is configured to control access to the first and second memory modules;
a first bus and a second bus coupled to the main controller;
wherein the first distributed controller is coupled to the main controller and the first bus, and wherein the main controller is configured to control access to the first distributed controller via the first bus;
a third bus and a fourth bus coupled to the first distributed controller;
wherein the first memory device is coupled to the first distributed controller and the third bus;
wherein the second memory device is coupled to the first distributed controller and the fourth bus;
wherein the first distributed controller is configured to control access to the first and second memory devices via the respective third and fourth busses such that the first distributed controller is enabled to perform reads from and writes to the first and second memory devices in parallel simultaneously via the respective third and fourth busses;
a second distributed controller coupled to the main controller and the second bus, wherein the main controller is configured to control access to the second distributed controller via the second bus; and
a fifth bus coupled to the second distributed controller;
wherein the third memory device is coupled to the second distributed controller and the fifth bus, wherein the second distributed controller is configured to control access to the third memory device via the fifth bus;
wherein the main controller and the first and second distributed controllers of the solid-state drive are configured such that the solid-state drive is enabled to perform reads from and writes to the first, second, and third memory devices in parallel simultaneously via the first, second, third, fourth, and fifth busses;
wherein the main controller and the first distributed controller are configured to perform reads from and writes to the first memory device via a first communication path comprising the first bus and the third bus;
wherein the main controller and the first distributed controller are configured to perform reads from and writes to the second memory device via a second communication path comprising the second bus and the fourth bus;
wherein the main controller and the second distributed controller are configured to perform reads from and writes to the third memory device via a third communication path comprising the second bus and the fifth bus;
wherein the first, second, and third communication paths are different;
wherein the first plurality of memory devices comprises more than one non-volatile memory technology;
wherein the first memory device comprises 3D non-volatile memory technology selected from the group consisting of: single-level cell (SLC) flash, multi-level cell (MLC) flash, SLC resistive random-access memory (ReRAM), and MLC ReRAM;
wherein the second memory device comprises 3D non-volatile memory technology selected from the group consisting of: triple-level cell (TLC) and quadruple-level cell (QLC);
wherein the main controller is configured to:
track memory technologies implemented in the first and second memory modules;
track memory technologies implemented in the first, second, and third memory devices; and
send data to the first and second memory modules based on:
the tracked memory technologies implemented in the first and second memory modules;
the tracked memory technologies implemented in the first, second, and third memory devices; and
determined frequencies that the data is to be accessed; and
wherein the first distributed controller is configured to:
track memory technologies implemented in the first plurality of memory devices;
store data in the first and second memory devices based on:
the tracked memory technologies implemented in the first plurality of memory devices; and
determined frequencies that the data is to be accessed; and
in response to storing data in the first and second memory devices, send confirmation to the main controller indicating in which of the first and second memory devices data was stored;
determining, by the main controller:
the frequency that the data packet is to be accessed;
the tracked memory technologies implemented in the first and second memory modules; and
the tracked memory technologies implemented in the first, second, and third memory devices; and
sending, by the main controller, the data packet to the first memory module based on the determining, by the main controller, of:
the frequency that the data packet is to be accessed;

the tracked memory technologies implemented in the first and second memory modules; and the tracked memory technologies implemented in the first, second, and third memory devices;

determining, by the first distributed controller:

the frequency that the data packet is to be accessed; and the track memory technologies implemented in the first plurality of memory devices;

storing, by the first distributed controller, the data packet in the first memory device based on the determining, by the first distributed controller, of:

the frequency that the data packet is to be accessed; and the track memory technologies implemented in the first plurality of memory devices; and in response to storing data in the first and second memory devices, sending, by the first distributed controller, confirmation to the main controller indicating the data packet was stored in the first memory device.

16. The method of claim 15, wherein the first plurality of memory devices comprises a third plurality of memory devices coupled to the first distributed controller and the third bus, wherein the third plurality of memory devices comprises the first memory device, wherein the first distributed controller is configured to control access to the third plurality of memory devices via the third bus, wherein the third bus comprises multiple distinct channels, and wherein the first distributed controller is configured to communicate with each memory die in the third plurality of memory devices independently and in parallel via the multiple distinct channels of the third bus.

17. The method of claim 16, wherein the third plurality of memory devices comprises more than one non-volatile memory technology selected from the group consisting of: 2D flash memory, 3D flash memory, ReRAM, and magnetoresistive random-access memory.

18. The method of claim 16, wherein the first plurality of memory devices comprises a fourth plurality of memory devices coupled to the first distributed controller and the fourth bus, wherein the fourth plurality of memory devices comprises the second memory device, wherein the first distributed controller is configured to control access to the fourth plurality of memory devices via the fourth bus, wherein the fourth bus comprises multiple distinct channels, and wherein the first distributed controller is configured to communicate with each memory die in the third and fourth pluralities of memory devices independently and in parallel via the multiple distinct channels of the third and fourth busses.

19. The method of claim 18, wherein the first memory device and the second memory device are different non-volatile memory technologies;

wherein the first memory device comprises non-volatile memory technology selected from the group consisting of: 2D flash memory, 3D flash memory, and ReRAM; and wherein the second memory device comprises non-volatile memory technology selected from the group consisting of: 2D flash memory and 3D flash memory.

20. The method of claim 15, wherein the first memory device comprises a first plurality of memory dies, wherein the third bus comprises multiple distinct channels, and wherein the first distributed controller is configured to communicate with each of the memory dies in the first plurality of memory dies independently and in parallel via the multiple distinct channels of the third bus.

21. The method of claim 20, wherein the first memory device comprises non-volatile memory technology selected from the group consisting of: 2D flash memory, 3D flash memory, and ReRAM.

22. The method of claim 20, wherein the second memory device comprises a second plurality of memory dies, wherein the fourth bus comprises multiple distinct channels, and wherein the first distributed controller is configured to communicate with each of the memory dies in the first and second pluralities of memory dies independently and in parallel via the multiple distinct channels of the third and fourth busses.

23. The method of claim 22, wherein the first memory device comprises non-volatile memory technology selected from the group consisting of: 2D flash memory, 3D flash memory, and ReRAM;

wherein the first memory device and the second memory device are different non-volatile memory technologies; and wherein the second memory device comprises non-volatile memory selected from the group consisting of: 2D flash memory and 3D flash memory.

24. The method of claim 15, wherein the first memory device comprises a plurality of memory dies, and wherein each memory die of the plurality of memory dies comprises read and write circuitry configured to read data from and write data to storage elements within the respective memory die independent of other read and write operations at other memory dies in the plurality of memory dies.

25. The method of claim 24, wherein the first memory device and the second memory device are different non-volatile memory technologies;

wherein the first memory device comprises non-volatile memory technology selected from the group consisting of: 2D flash memory, 3D flash memory, and ReRAM; and wherein the second memory device comprises non-volatile memory technology selected from the group consisting of: 2D flash memory and 3D flash memory.

26. The method of claim 15, wherein the main controller is configured to reference a first memory table to determine:

the tracked memory technologies implemented in the first and second memory modules; and the tracked memory technologies implemented in the first, second, and third memory devices;

wherein the storing of the data in the first and second memory modules by the main controller is based on the referencing of the first memory table;

wherein the first distributed controller is configured to reference a second memory table to determine the tracked memory technologies implemented in the first plurality of memory devices; and wherein the storing of the data in the first and second memory devices by the first distributed controller is based on the referencing of the second memory table.

* * * * *